United States Patent
Kim et al.

(10) Patent No.: US 11,381,382 B2
(45) Date of Patent: Jul. 5, 2022

(54) OPERATING METHOD OF MEMORY CONTROLLER, CLOUD COMPUTING DEVICE AND EDGE COMPUTER

(71) Applicant: SAMSUNG ELECTRONICS CO., LTD., Suwon-si (KR)

(72) Inventors: Kwang Hoon Kim, Hwaseong-si (KR); Pil Sang Yoon, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/145,617

(22) Filed: Jan. 11, 2021

(65) Prior Publication Data

US 2021/0336766 A1 Oct. 28, 2021

(30) Foreign Application Priority Data

Apr. 28, 2020 (KR) ........................ 10-2020-0051439

(51) Int. Cl.
| | |
|---|---|
| *G06F 11/10* | (2006.01) |
| *H04L 9/00* | (2022.01) |
| *H04L 9/08* | (2006.01) |
| *H04L 9/30* | (2006.01) |
| *G06F 12/14* | (2006.01) |
| *H04L 9/06* | (2006.01) |

(52) U.S. Cl.
CPC ........ *H04L 9/0618* (2013.01); *G06F 11/1068* (2013.01); *H04L 9/008* (2013.01); *H04L 9/0827* (2013.01); *H04L 9/0869* (2013.01)

(58) Field of Classification Search
CPC ..... H04L 9/0618; H04L 9/008; H04L 9/0827; H04L 9/0869; H04L 9/0825; H04L 9/3093; H04L 9/0852; G06F 11/1068; G06F 12/1408
See application file for complete search history.

(56) References Cited

U.S. PATENT DOCUMENTS

| | | | |
|---|---|---|---|
| 8,630,422 | B2 | 1/2014 | Gentry |
| 2013/0170640 | A1* | 7/2013 | Gentry .................. H04L 9/008 380/30 |
| 2017/0085377 | A1 | 3/2017 | Pogmore et al. |
| 2018/0063092 | A1 | 3/2018 | Ollikainen et al. |

(Continued)

FOREIGN PATENT DOCUMENTS

| | | |
|---|---|---|
| EP | 3547603 | 10/2019 |
| JP | 5790471 | 8/2015 |

(Continued)

OTHER PUBLICATIONS

European Search Report dated Jun. 14, 2021 in corresponding European Patent Appln. Serial No. 20217872.9.

(Continued)

*Primary Examiner* — Vu V Tran
(74) *Attorney, Agent, or Firm* — F. Chau & Associates, LLC (57) ABSTRACT

An operating method of a memory controller includes generating a random value using a seed, generating encrypted intermediate data by encrypting plaintext data using the random value, and storing the seed and the intermediate data in a memory device. Ciphertext data is generated using the seed and the intermediate data based on Ring Learning with Error (RLWE).

10 Claims, 7 Drawing Sheets

(56) References Cited

U.S. PATENT DOCUMENTS

2018/0131512 A1   5/2018  Gajek
2019/0007197 A1*  1/2019  Laine .................... H04L 9/008
2019/0394019 A1   12/2019 Gao
2020/0259647 A1*  8/2020  Goncalves ............. H04L 9/30

FOREIGN PATENT DOCUMENTS

KR    10-1829267    2/2018
KR    10-2019159    9/2018

OTHER PUBLICATIONS

Benjamin M Case et al., "Fully Homomorphic Encryption with k-bit Arithmetic Operations", IACR, International Association for Cryptologic Research, vol. 20190 520:202702 May 20, 2019 (May 20, 2019), pp. 1-41.

Yang et al., "Secure Cloud Storage Based on RLWE Problem", IEEE Access, vol. 7, Mar. 13, 2019, pp. 27604-27614.

* cited by examiner

OPERATING METHOD OF MEMORY CONTROLLER, CLOUD COMPUTING DEVICE AND EDGE COMPUTER

CROSS-REFERENCE TO RELATED APPLICATIONS

This application claims priority under 35 U.S.C. § 119 to Korean Patent Application No. 10-2020-0051439, filed on Apr. 28, 2020 in the Korean Intellectual Property Office, the disclosure of which is incorporated by reference herein in its entirety.

TECHNICAL FIELD

Exemplary embodiments of the present disclosure relate to an operating method of a memory controller, an operating method of a cloud computing device, and an operating method of an edge computer.

DISCUSSION OF RELATED ART

With the advent of the quantum computing era, studies on secure post-quantum cryptography are being actively conducted. Cryptography based on Ring Learning with Error (RLWE) is one solution. RLWE-based cryptography is widely employed in the field of homomorphic encryption for protecting a user's privacy in a cloud computing environment.

SUMMARY

Aspects of the present disclosure provide an operating method of a memory controller that is capable of saving storage space in an environment using RLWE-based cryptography.

Aspects of the present disclosure also provide an operating method of a cloud computing device that is capable of reducing data-sharing traffic in an environment using RLWE-based cryptography.

Aspects of the present disclosure also provide an operating method of an edge computer that is capable of reducing data-sharing traffic in an environment using RLWE-based cryptography.

However, aspects of the present disclosure are not restricted to those described above.

According to an exemplary embodiment of the present disclosure, an operating method of a memory controller includes generating a random value using a seed, generating encrypted intermediate data by encrypting plaintext data using the random value, and storing the seed and the intermediate data in a memory device. Ciphertext data is generated using the seed and the intermediate data based on Ring Learning with Error (RLWE).

According to an exemplary embodiment of the present disclosure, an operating method of a memory controller includes generating a random value using a seed, in which the seed is an address corresponding to user data or plaintext data obtained by encoding the user data, generating encrypted intermediate data by encrypting the plaintext data using the random value, and storing the intermediate data in an area corresponding to the address in a memory device. Ciphertext data is generated using the seed and the intermediate data based on Ring Learning with Error (RLWE), and the seed is not stored in the memory device.

According to an exemplary embodiment of the present disclosure, an operating method of a memory controller includes generating plaintext data by encoding user data, generating a random value using pseudo random number generation based on a seed, in which the seed includes at least one of an address, a timestamp, or metadata corresponding to the user data, generating encrypted intermediate data by encrypting the plaintext data using the random value, in which the random value, the plaintext data, and the intermediate data are equal in length, storing the seed and the intermediate data in a memory device, reading the seed and the intermediate data stored in the memory device, regenerating a random value using pseudo random number generation based on the read seed, generating Ring Learning with Error (RLWE)-based ciphertext data using the regenerated random value and the read intermediate data, and generating and outputting the user data by decrypting and decoding the ciphertext data.

According to an exemplary embodiment of the present disclosure, an operating method of a cloud computing device includes storing, in a storage area, a seed and encrypted intermediate data received from an edge computer, reading the seed and the intermediate data from the storage area, generating a random value using the read seed, and generating Ring Learning with Error (RLWE)-based ciphertext data using the random value and the read intermediate data.

According to an exemplary embodiment of the present disclosure, an operating method of an edge computer includes generating a random value using a seed, generating encrypted intermediate data by encrypting plaintext data using the random value, and providing the seed and the intermediate data to a cloud computing device. Ciphertext data is generated using the seed and the intermediate data based on Ring Learning with Error (RLWE).

BRIEF DESCRIPTION OF THE DRAWINGS

The above and other aspects and features of the present disclosure will become more apparent by describing in detail exemplary embodiments thereof with reference to the accompanying drawings, in which.

DETAILED DESCRIPTION OF THE EXEMPLARY EMBODIMENTS

Exemplary embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

It should be understood that descriptions of features or aspects within each exemplary embodiment should typically be considered as available for other similar features or aspects in other exemplary embodiments, unless the context clearly indicates otherwise.

As used herein, the singular forms "a", "an" and "the" are intended to include the plural forms as well, unless the context clearly indicates otherwise.

Figure 1:
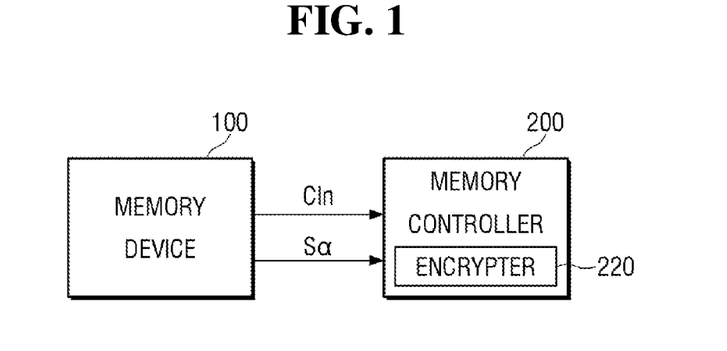
FIG. 1 is a block diagram illustrating a storage device according to exemplary embodiments of the present disclosure.
Figure 2:
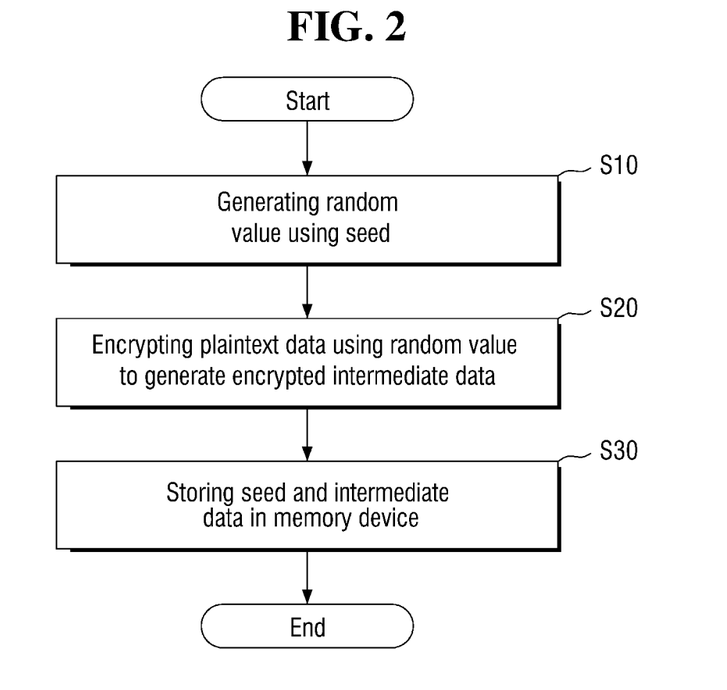
FIG. 2 is a flowchart describing an operating method (program operation) of a memory controller of FIG. 1.
Figure 3:
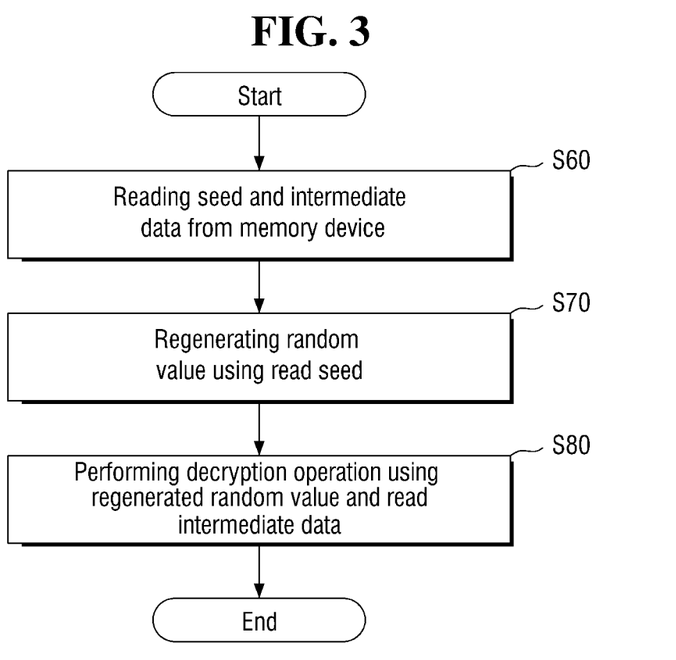
FIG. 3 is a flowchart describing an operating method (read operation) of the memory controller of FIG. 1.

FIG. 1 is a block diagram illustrating a storage device according to exemplary embodiments of the present disclosure. FIG. 2 is a flowchart describing an operating method (program operation) of a memory controller of FIG. 1. FIG. 3 is a flowchart describing an operating method (read operation) of the memory controller of FIG. 1.

According to exemplary embodiments, a storage device includes a memory device 100 and a memory controller 200, as shown in FIG. 1.

The storage device may be implemented as, for example, a smart card, a secure digital (SD) card, a multimedia card (MMC), an embedded MMC (eMMC), an embedded multi-chip package (eMCP), a perfect page NAND (PPN), a universal flash storage (UFS), a universal serial bus (USB) flash drive, a solid state drive (SSD), or an embedded SSD (eSSD). However, the storage device is not limited thereto.

The memory controller 200 controls overall operations of the memory device 100. The memory controller 200 may interpret a command, an address, data, etc. received from a host, and may control the operation of the memory device 100 based on a result of the interpretation. For example, exemplary embodiments may receive a program command/address/data from the host, and may store the data at the address of the memory device 100. Exemplary embodiments may also read and output the data stored in the address of the memory device 100 based on a read command/address received from the host.

The memory device 100 may be, for example, a nonvolatile memory device (e.g., a NAND flash memory device). However, the memory device 100 is not limited thereto.

The memory controller 200 may include an encrypter 220 which encrypts user data received from the host. According to exemplary embodiments of the present disclosure, the memory device 100 does not store final ciphertext data $C2n$ generated with Ring Learning with Error (RLWE)-based cryptography in the memory device 100. Rather, a seed $S\alpha$ and intermediate data $CIn$ used to generate RLWE-based ciphertext data are stored in the memory device 100. The seed $S\alpha$ may also be referred to herein as seed data $S\alpha$. Here, $\alpha$ denotes the data length of the seed $S\alpha$, and n denotes the data length of the intermediate data $CIn$. Here, $\alpha$ and n are natural numbers, and $\alpha$ is less than n.

Each of the intermediate data $CIn$ and the seed $S\alpha$ is shorter in length than the RLWE-based ciphertext data $C2n$, and the intermediate data $CIn$ and the seed $S\alpha$ are stored in the memory device 100. Thus, according to exemplary embodiments, storage space of the memory device 100 may be saved by storing the intermediate data $CIn$ and the seed $S\alpha$ in the memory device 100 instead of storing the finally generated RLWE-based ciphertext data $C2n$ in the memory device 100. The data length of the ciphertext data $C2n$ is $2n$, and the sum of the data lengths of the intermediate data $CIn$ and the seed $S\alpha$ is $n+\alpha$. Because $\alpha$ is less than n, storing the intermediate data $CIn$ and the seed $S\alpha$ may reduce the amount of data being stored in the memory device 100. Furthermore, the intermediate data $CIn$ is data encrypted by the encrypter 220, which may improve the security of the storage device.

Referring to a comparative example, in the case of using RLWE-based cryptography having a homomorphic encryption architecture, ciphertext data tends to be larger in size (or length) than corresponding plaintext data. Such an increase in data size may be burdensome in terms of capacity of a memory device and data-sharing traffic in a cloud computing environment. Exemplary embodiments of the present disclosure utilize RLWE-based cryptography in a manner that may save storage space of such a memory device, and reduce data-sharing traffic in a cloud computing environment.

The aforementioned programming (encryption) operation and storage operation will be described hereinafter in further detail with reference to FIG. 2.

First, the memory controller 200 generates a random value $An$ using a seed $S\alpha$ at operation S10.

The seed $S\alpha$ may include, for example, at least one of an address, a timestamp, or metadata corresponding to the user data or plaintext data.

The term "address" as used herein may denote a logical address or a physical address. For example, the address may correspond to an address provided from outside of the storage device (e.g., provided by a host) or an address generated in the storage device. The address may also be an address corresponding to the user data or the plaintext data generated by encoding the user data.

The term "timestamp" may denote a timestamp indicative of a time when the user data or the plaintext data is generated or provided. In another preconfigured scheme, the timestamp may also be a timestamp indicative of a time after the elapsing of a predetermined time period from a time point when the user data or the plaintext data is generated or provided.

The term "metadata" may denote the number of valid pages included in a memory block, pages valid in the memory block, etc.

However, the terms defined above are not limited thereto.

The seed $S\alpha$ may include at least one of a page address (e.g., logical address or physical address) or a unique ID of a NAND flash memory. For example, the page address and the unique ID may be used independently or jointly.

On the basis of the seed $S\alpha$, a random number generator may generate a random value $An$.

The random value An may be, for example, a uniform random value. For example, all random values generatable by the random number generator may be generated at substantially the same probability.

For this purpose, the random number generator may be, for example, a pseudo-random number generator (PRNG). Examples of the pseudo-random number generator may include, but are not limited thereto, a linear feedback shift register (LFSR), a lagged Fibonacci generator (LFG), a linear congruential generator (LCG), a Park-Miller generator, an inversive congruential generator (ICG), an add-with-carry (AWC) generator, a subtract-with-borrow (SWC) generator, a multiply-with-carry (MWC) generator, a complementary-multiply-with-carry (CMWC) generator, a Mersenne Twister (MT) generator, a Well Equidistributed Long-period Linear (WELL) generator, a small noncryptographic PRNG (JSF) generator, an advanced randomization system (ARS) generator, a permuted congruential generator (PCG), and a random cycle bit generator (RCB). For example, in the case of using the linear feedback shift register (LFSR) as the pseudo-random number generator, the pseudo-random number generator may be structured in the form of a generator polynomial.

In the case of using the aforementioned pseudo-random number generator, the same seed $S\alpha$ may generate the same random value An.

Furthermore, in the case of generating a random value An with the aforementioned pseudo-random number generator, if a random seed $S\alpha$ has a data length $\alpha$, the generated random value An may have a data length n.

Next, the memory controller 200 encrypts the plaintext data using the random value to generate encrypted intermediate data at operation S20.

According to exemplary embodiments, the random value An, the intermediate data CIn, and the plaintext data Xn satisfy the following equations. Here, Sn denotes an encryption key for encryption, En denotes a noise (error) value for use in the RLWE-based cryptography, and Bn denotes an intermediate value which is generated by encrypting the random value using the encryption key.

$$Bn=AnSn+En$$

$$CIn=Bn+Xn$$

Here, because the data length of the encrypted intermediate data CIn is n, it may be identified that the random value An and the intermediate data CIn are equal in data length to each other. In an exemplary embodiment, the encrypted intermediate data CIn, the random value An, and the plaintext data Xn are equal in length to one another.

Next, the memory controller 200 stores the seed $S\alpha$ and the intermediate data CIn in the memory device 100 at operation S30.

For example, according to exemplary embodiments, instead of the RLWE-based (final) ciphertext data C2n being stored in the memory device 100, the seed $S\alpha$ and the intermediate data CIn for use in generating the RLWE-based ciphertext data C2n are stored in the memory device 100. The sum of the data lengths of the intermediate data CIn and the seed $S\alpha$ being stored in the memory device 100 is n+$\alpha$, which is smaller than the size of the data length of the finally generated RLWE-based ciphertext data C2n. Thus, the memory device 100 may save storage spaced in comparison with a memory device which stores the finally generated RLWE-based ciphertext data C2n therein.

According to exemplary embodiments, the random value An, the intermediate data CIn, and the RLWE-based ciphertext data C2n satisfy the following relational equation:

$$C2n=(An,CIn)=(An,Bn+Xn)$$

Here, it may be identified that the data length of the ciphertext data C2n is 2n, and $\alpha$ is less than n. Accordingly, storing the intermediate data CIn and the seed $S\alpha$, instead of storing the ciphertext data C2n, in the memory device 100, may save storage space of the memory device 100.

Hereinafter, a description of the read operation of the memory device 100 will be described in further detail with reference to FIG. 3.

First, when a read command/address is provided from a host, the memory controller 200 interprets the read command/address and reads the seed $S\alpha$ and intermediate data CIn from the memory device 100 at operation S60. For example, the seed $S\alpha$ and the intermediate data CIn stored at the location corresponding to the address received from the host are read out.

Next, the memory controller 200 regenerates the random value An, at operation S70, using the read seed $S\alpha$.

As described above, a pseudo-random number generator is used in exemplary embodiments of the present disclosure. The pseudo-random number generator generates the same random value An with the same seed $S\alpha$. Thus, when the seed $S\alpha$ read from the memory device 100 is input to the pseudo-random number generator, a random value An that is the same as that used in the data storage process may be acquired.

Next, the memory controller 200 performs a decryption operation, at operation S80, using the regenerated random value An and the intermediate data CIn read from the memory device 100.

For example, exemplary embodiments may generate the RLWE-based ciphertext data C2n using the regenerated random value An and the read intermediate data CIn, and may decrypt the generated RLWE-based ciphertext data C2n to generate the plaintext data Xn. Next, the plaintext data Xn is decoded to generate and output user data Dm.

According to exemplary embodiments of the present disclosure, the operating method of the memory controller 200 includes storing the seed $S\alpha$ and encrypted intermediate data CIn in the memory device 100 during the program operation. During the read operation, the operating method of the memory controller 200 includes reading the seed $S\alpha$ and the intermediate data CIn, and regenerating the random value An using the read seed $S\alpha$ to proceed to use the random value An. According to exemplary embodiments, storing the seed $S\alpha$ for use, only if necessary, in regenerating the random value An, as described above, rather than storing the RLWE-based ciphertext data C2n in the memory device 100, may result in saving storage space of the memory device 100.

Hereinafter, an exemplary implementation of the operations described above with reference to FIGS. 1 to 3 will be described with reference to FIGS. 4 and 5.

Figure 4:
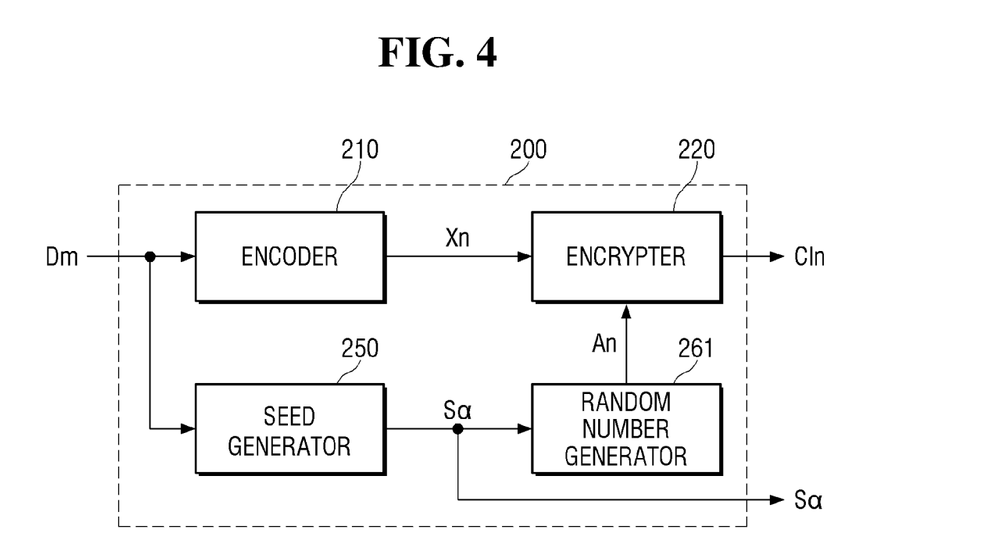
FIGS. 4 and 5 are block diagrams illustrating a storage device according to an exemplary embodiment of the present disclosure.

FIG. 4 is a block diagram illustrating a storage device according to an exemplary embodiment of the present disclosure. FIG. 4 is a drawing referred to for describing the program operation described with reference to FIG. 2.

Referring to FIG. 4, in the storage device according to an exemplary embodiment of the present disclosure, the memory controller 200 includes an encoder 210, an encrypter 220, a seed generator 250, and a random number generator 261 used for the program operation.

The output of the encoder 210 is input to the encrypter 220, and the data input to the encrypter 220 is converted to a format fit for use in the encryption scheme. The encoder 210 encodes the user data Dm received from the host to generate plaintext data Xn. The user data Dm has a data length m (e.g., m is a natural number), the plaintext data Xn has a data length n, and m is less than n.

When the user data Dm provided from the host is already in a format fit for use in the encryption scheme of the encrypter 220, the encoder 210 may be omitted.

The seed generator 250 generates a seed Sα having a data length α.

The seed Sα output from the seed generator 250 may include at least one of, for example, an address, a timestamp, or metadata corresponding to the user data Dm (or corresponding indirectly to the plaintext data). The address corresponding to the user data Dm may be a logical address or a physical address. The timestamp corresponding to the user data Dm may be a timestamp indicative of a time when the user data Dm is provided. In another preconfigured scheme, the timestamp may be a timestamp indicative of a time after the elapsing of a predetermined time period from a time point when the user data Dm is provided. The metadata corresponding to the user data Dm may denote the number of valid pages included in a memory block, pages valid in the memory block, etc. However, the metadata corresponding to the user data DM is not limited thereto. The seed Sα may also include a page address (e.g., logical address or physical address) and a unique ID of a NAND flash memory that can be used independently or jointly.

The random number generator 261 generates a random value An using the seed Sα, and outputs the random value An. Although the random value An may be a uniform random value and a pseudo-random number generator (PRNG) may be used as the random number generator as described above, the present disclosure is not limited thereto.

The encrypter 220 encrypts the plaintext data Xn using the random value An, and generates and outputs encrypted intermediate data CIn. As described above, the random value An, the intermediate data CIn, and the plaintext data Xn satisfy the following equations.

$$Bn = AnSn + En$$

$$CIn = Bn + Xn$$

Here, Sn denotes an encryption key for encryption, and En denotes a noise (error) value for use in the RLWE-based cryptography.

Thus, as described above, according to exemplary embodiments, the intermediate data CIn and the seed Sα for use in generating the RLWE-based ciphertext data are stored in the memory device 100.

Figure 5:
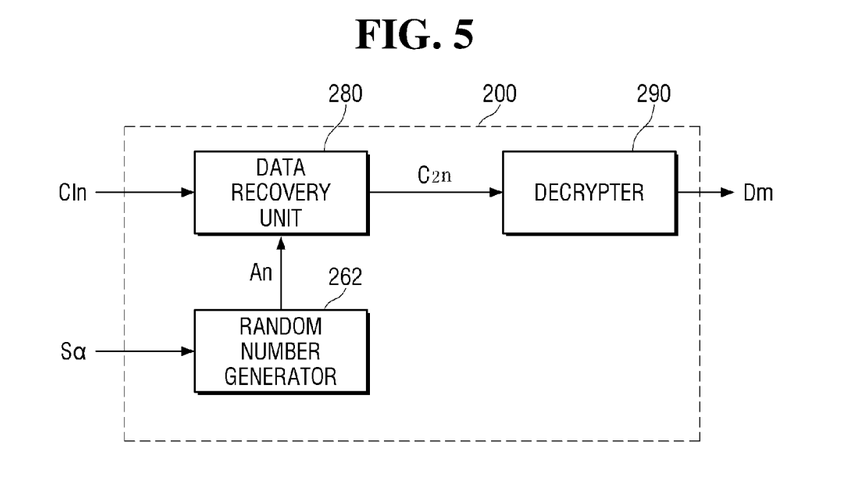

FIG. 5 is a block diagram illustrating the storage device according to an exemplary embodiment of the present disclosure. FIG. 5 is a drawing referred to for describing the read operation described with reference to FIG. 3.

Referring to FIG. 5, in an exemplary embodiment, the memory controller 200 includes a data recovery unit 280, a random number generator 262, and a decrypter 290 for the read operation.

A command/address instruction to read the data (e.g., the intermediate data CIn and the seed Sα) stored in the memory device 100 is received from a host. The memory controller 200 reads the intermediate data CIn and seed Sα stored at the address.

The random number generator 262 generates a random value An using the seed Sα. The random number generator 262 may be, for example, a pseudo-random number generator (PRNG), as described above. The random number generator 262 may be the same as the random number generator (see 261 in FIG. 4) in use for the program operation. For example, when the random number generator 261 is a linear feedback shift register (LFSR), the random number generator 262 may also be a linear feedback shift register (LFSR). According to exemplary embodiments, one random number generator may be commonly used for both the program and read operations.

Because the random number generator 262 in FIG. 5 is identical to the random number generator 261 in FIG. 4, the random value An generated by the random number generator 262 using the seed Sα is identical to the random number An generated by the random number generator 261 using the seed Sα.

The data recovery unit 280 generates RLWE-based ciphertext data C2n using the generated seed Sα and the intermediated data CIn. As described above, the ciphertext data C2n satisfies the following relational equation.

$$C2n = (An, CIn) = (An, Bn + Xn)$$

The decrypter 290 decrypts/deciphers and decodes the ciphertext data C2n to generate user data Dm.

Thus, as described above, according to exemplary embodiments, the memory controller 200 regenerates the random value An using the seed Sα during the read operation. The RLWE-based ciphertext data C2n generated based on the regenerated random value An and the intermediate data CIn is decrypted and decoded to be output as the user data Dm.

Figure 6:
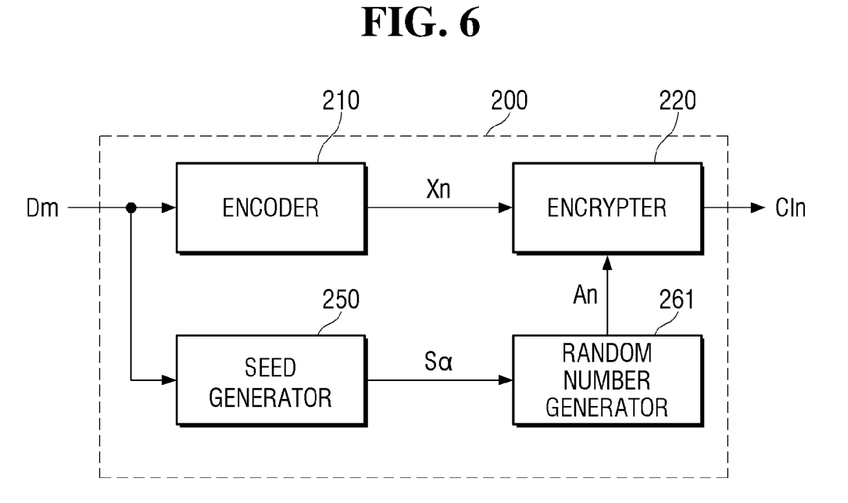
FIG. 6 is a block diagram illustrating a storage device according to an exemplary embodiment of the present disclosure.
Figure 7:
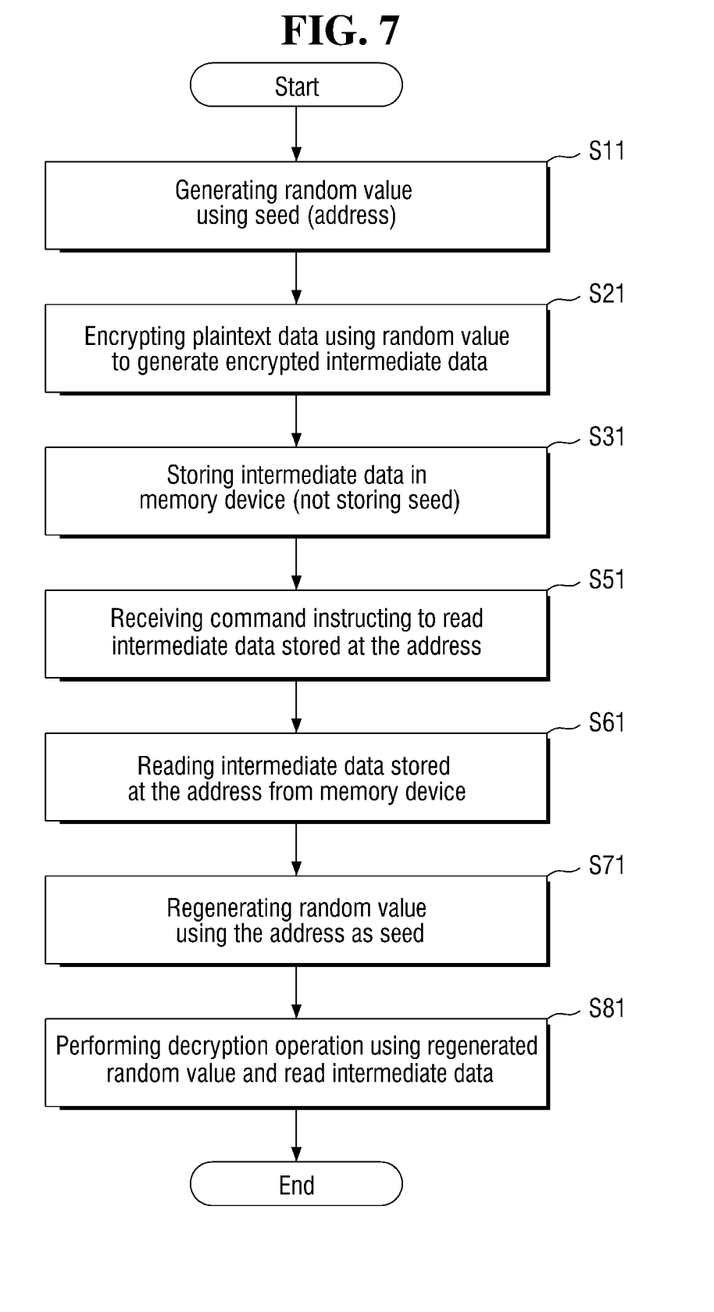
FIG. 7 is a flowchart illustrating an operating method of a memory controller in a storage device according to the exemplary embodiment of FIG. 6.

FIG. 6 is a block diagram illustrating a storage device according to an exemplary embodiment of the present disclosure. FIG. 7 is a flowchart illustrating an operating method of a memory controller in a storage device according to the exemplary embodiment of FIG. 6. For convenience of explanation, a further description of processes, elements, and technical aspects previously described may be omitted, and the following description will focus on differences relative to the description above with reference to FIGS. 1 to 5.

Referring to FIG. 6, in an exemplary embodiment of the present disclosure, the storage device may use an address corresponding to user data Dm (or an address corresponding to plaintext data Xn) as a seed Sα. In this case, the seed Sα generated by the seed generator 250 is provided to the random number generator 260 without being stored in the memory device 100.

Referring to FIG. 7, the seed generator 250 generates the address corresponding to the user data Dm as the seed Sα.

The random number generator 261 generates a random value An using the seed Sα (e.g., address corresponding to the user data Dm) at operation S11.

Meanwhile, the encoder 210 encodes the user data Dm to generate the plaintext data Xn.

Next, the encrypter 220 encrypts the plaintext data Xn using the random value An to generate the encrypted intermediate data CIn at operation S21.

Next, the memory controller 200 stores the intermediate data CIn in the memory device 100 at operation S31 with the exclusion of the seed Sα. For example, the generated intermediate data CIn is stored at a location corresponding to the address used for the seed Sα in the memory device 100, and the seed Sα is not stored.

Meanwhile, the memory controller 200 receives, at operation S51, a command instructing to read the intermediate data CIn stored at the corresponding address from the host. Here, the address at which the intermediate data CIn is stored is provided along with the read command from the host.

Next, the memory controller 200 reads, at operation S61, the intermediate data CIn stored at the corresponding address of the memory device 100.

Next, the memory controller 200 generates, at operation S71, a random value An using the address received from the host as the seed Sα. By using the address, which is the same as the address in use as the seed Sα for the program operation, as the seed Sα in the read operation, exemplary embodiments may regenerate the random value An that is the same as the random value An generated in the program operation.

Next, the memory controller 200 performs, at operation S81, decryption and decoding operations using the regenerated random value An and the read intermediate data CIn to generate the user data Dm.

Thus, according to exemplary embodiments, only the intermediate data CIn is stored in the memory device 100, with the exclusion of the seed Sα, in the program operation in the case of using the information (e.g., address) related to the program operation on the user data Dm as the seed Sα. This is possible because, in exemplary embodiments, it is not necessary to separately store the address that is provided by the host whenever the read operation is performed. This method may further reduce the data amount to be stored in the memory device 100.

Figure 8:
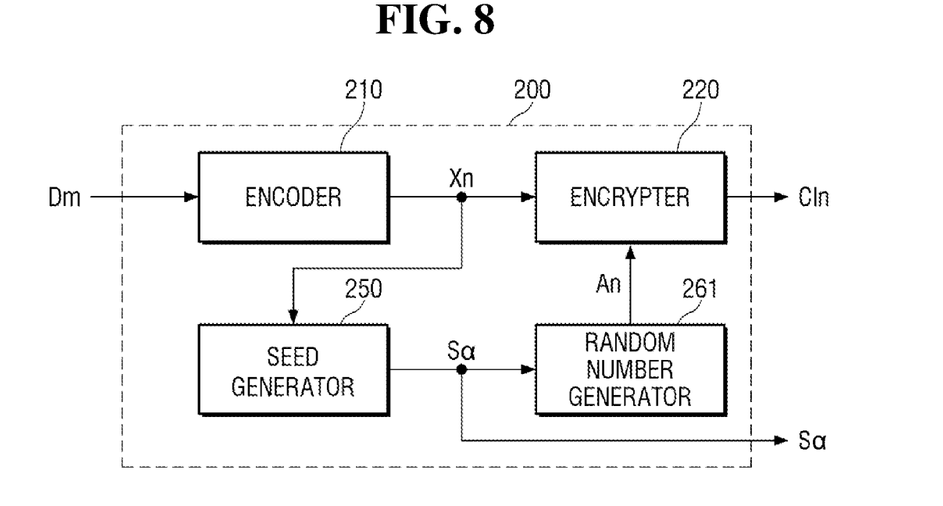
FIG. 8 is a block diagram illustrating a storage device according to an exemplary embodiment of the present disclosure.

FIG. 8 is a block diagram illustrating a storage device according to an exemplary embodiment of the present disclosure. For convenience of explanation, a further description of processes, elements, and technical aspects previously described may be omitted, and the following description will focus on differences relative to the description above with reference to FIGS. 1 to 5.

Referring to FIG. 8, in the storage device according to an exemplary embodiment of the present disclosure, the seed generator 250 generates a seed Sα based on plaintext data Xn.

The seed Sα may include, for example, at least one of an address (e.g., page address), a timestamp, or metadata corresponding to the plaintext data Xn. The address corresponding to the plaintext data Xn may be a logical address or a physical address. The timestamp corresponding to the plaintext data Xn may be a timestamp indicative of a time when the plaintext data Xn is provided. In another preconfigured scheme, the timestamp may be a timestamp indicative of a time after the elapsing of a predetermined time period from a time point when the plaintext data Xn is provided. The metadata corresponding to the plaintext data Xn may denote the number of valid pages included in a memory block, pages valid in the memory block, etc. However, the metadata corresponding to the plaintext data Xn is not limited thereto. The seed Sα may also include a page address (e.g., logical address or physical address) and a unique ID of a NAND flash memory that can be used independently or jointly.

Figure 9:
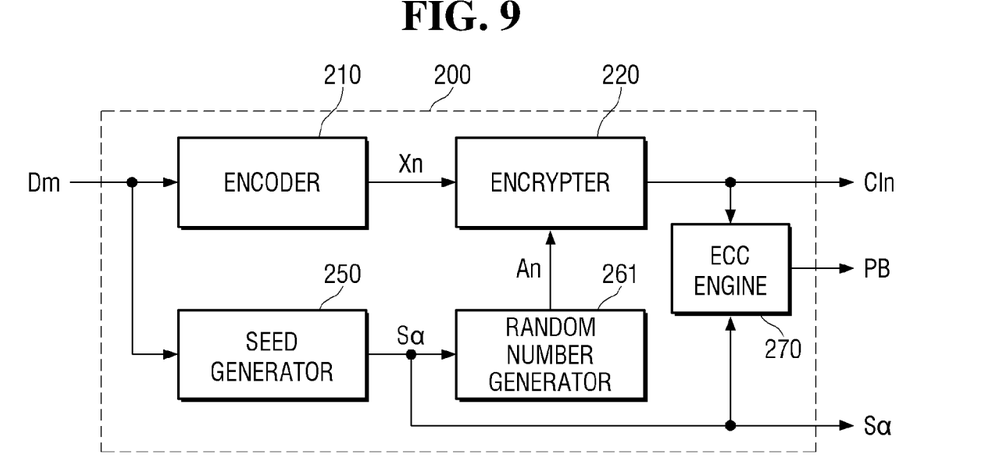
FIG. 9 is a block diagram illustrating a storage device according to an exemplary embodiment of the present disclosure.

FIG. 9 is a block diagram illustrating a storage device according to an exemplary embodiment of the present disclosure. For convenience of explanation, a further description of processes, elements, and technical aspects previously described may be omitted, and the following description will focus on differences relative to the description above with reference to FIGS. 1 to 5.

Referring to FIG. 9, in the storage device according to an exemplary embodiment of the present disclosure, the memory controller 200 includes an encoder 210, an encrypter 220, a seed generator 250, a random number generator 261, and an ECC engine 270.

The ECC engine 270 performs an encoding operation on at least one of the intermediate data CIn or the seed Sα to generate parity data PB. In the read operation, the ECC engine 270 performs an error correction operation on the data (e.g., the intermediate data CIn and/or the seed Sα) read using the parity data PB. Using the parity data PB can improve reliability of the intermediate data CIn and the seed Sα, which may result in improved reliability of the user data Dm generated through decryption/decoding.

Figure 10:
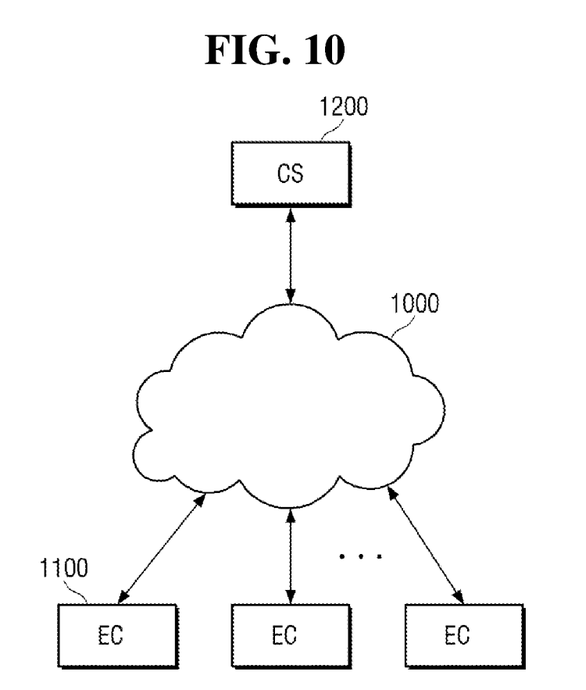
FIG. 10 is a diagram illustrating a cloud environment in use by a cloud computing device according to exemplary embodiments of the present disclosure.

FIG. 10 is a diagram illustrating a cloud environment in use by a cloud computing device according to exemplary embodiments of the present disclosure.

Referring to FIG. 10, at least one edge computer 1100 and at least one cloud computing device 1200 may communicate with each other through a network 1000. The at least one edge computer 1100 may be, for example, a computer used in a distributed computing environment that uses the network 1000.

The network 1000 may include both wireline and wireless communication networks. Examples of the wireless communication network may include a cellular communication network using at least one of long term evolution (LTE), LTE-advanced (LTE-A), code division multiple access (CDMA), wideband CDMA (WCDMA), universal mobile telecommunication system (UMTS), wireless broadband (WiBro), or global system for mobile communications (GSM). Examples of the wireless communication network may also include wireless fidelity (Wi-Fi), light fidelity (LiFi), Bluetooth, Bluetooth low energy (BLE), Zigbee, near field communication (NFC), magnetic secure transmission, radio frequency (RF), and body area network (BAN). Examples of the wireless communication network may also include a global navigation satellite system (GNSS). However, the wireless communication network is not limited thereto. Examples of the GNSS may include a global positioning system (GPS), a global navigation satellite system (Glonass), a Beidou navigation satellite system (hereinafter, "Beidou") and Galileo, which is the European global satellite-based navigation system. Examples of the wireline communication network may include at least one of universal serial bus (USB), high definition multimedia interface (HDMI), recommended standard 232 (RS-232), power line communication, plain old telephone service (POTS), or computer network (e.g., LAN or WAN). However, the wireline communication network is not limited thereto.

The edge computer 1100 is a computing device utilized for a user's access to the network, and may be any computing device having distributed processing capability in a distributed open architecture. Such an edge computer 1100 is not limited to a specific device, and examples of the edge computer 1100 may include at least one of a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), an MP3 player, a medical appliance, a camera, or a wearable device. However, such an edge computer 1100 is not limited thereto. The wearable device may include at least one of an accessary-type (e.g., watch, ring, bracelet, anklet, necklace, glasses, contact lens, or head-mounted-device (HMD)), a fabric or cloth-integrated type (e.g., electronic clothing), a body-attached type (e.g., skin-pad or tattoo), or a body implanted type circuit. However, the wearable device is not limited thereto. In exemplary embodiments, examples of an electronic device may include a television, a digital video disc (DVD) player, an audio player, a refrigerator, an air conditioner, a cleaner, an oven, a microwave oven, a washing machine, an air purifier, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, and an electronic frame. However, the electronic device is not limited thereto.

Examples of the electronic device may further include a medical device such as, for example, portable medical sensors (e.g., a glucometer, a heart rate sensor, a tonometer, and a body thermometer), a magnetic resonance angiography (MRA) device, a magnetic resonance imaging (MRI) device, a computed tomography (CT) device, a camcorder, and a microwave scanner. Examples of the electronic device may further include a navigation device, a global navigation satellite system (GNSS), an event data recorder (EDR), a flight data recorder (FDR), an automotive infotainment device, marine electronic equipment (e.g., a marine navigation system and a gyro compass), aviation electronics (avionics), a security device, an automotive head unit, an industrial or household robot, a drone, an automatic teller machine (ATM) of a financial organization, a point of sales (POS) terminal, and an internet-of-things (IoT) device (e.g., an electric bulb, a sensor, a sprinkler system, a fire alarm system, a temperature controller, a street lamp, a toaster, fitness equipment, a hot water tank, a heater, and a boiler). Examples of the electronic device may further include furniture, a building/structure, a part of a vehicle, an electronic board, an electronic signature receiving device, a projector, and a sensor (e.g., water, electricity, gas, and electric wave meters). In exemplary embodiments, the electronic device may be flexible or a combination of at least two of the aforementioned devices.

The edge computer 1100 may autonomously collect/process data, which relatively reduces the data amount to be processed by the cloud computing device 1200. As a result, a load on the cloud computing device 1200 may be reduced.

Hereinafter, a description of a method of reducing data-sharing traffic between the edge computer 1100 and the cloud computing device 1200, even in an environment employing RLWE-based cryptography, will be described with reference to FIGS. 11 to 13.

Figure 11:
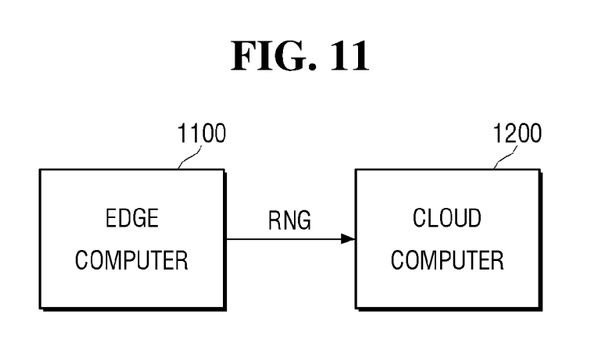
FIG. 11 is a diagram illustrating an authentication process between a cloud computing device and an edge computer according to exemplary embodiments of the present disclosure.

FIG. 11 is a diagram illustrating an authentication process between a cloud computing device and an edge computer according to exemplary embodiments of the present disclosure. FIG. 12 is a diagram illustrating a data sharing process between a cloud computing device and an edge computer according to exemplary embodiments of the present disclosure. FIG. 13 is a flowchart illustrating an operating method of a cloud computing device according to exemplary embodiments of the present disclosure.

Referring to FIG. 11, in an exemplary embodiment, the edge computer 1100 and the cloud computing device 1200 identify a random number generator RNG available for use in an authentication operation between the edge computer 1100 and the cloud computing device 1200. For example, the edge computer 1100 notifies the cloud computing device 1200 of the random number generator in use by the edge computer 1100 before sharing data with the cloud computing device 1200. The cloud computing device 1200 may also designate/indicate a random number generator to be used by the edge computer 1100.

Figure 12:
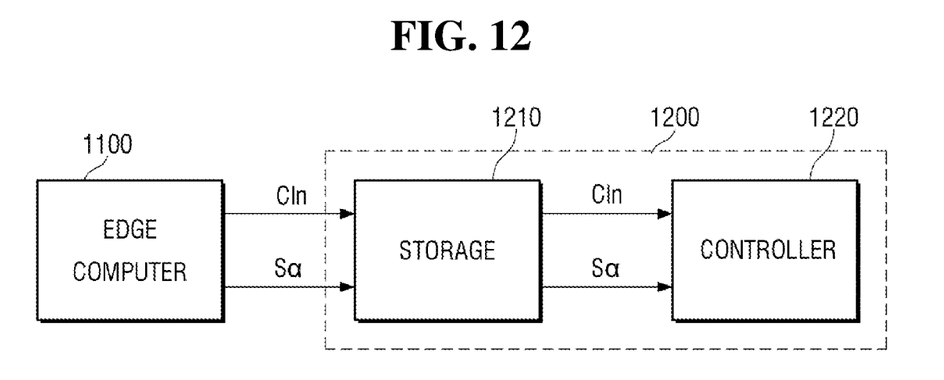
FIG. 12 is a diagram illustrating a data sharing process between a cloud computing device and an edge computer according to exemplary embodiments of the present disclosure.
Figure 13:
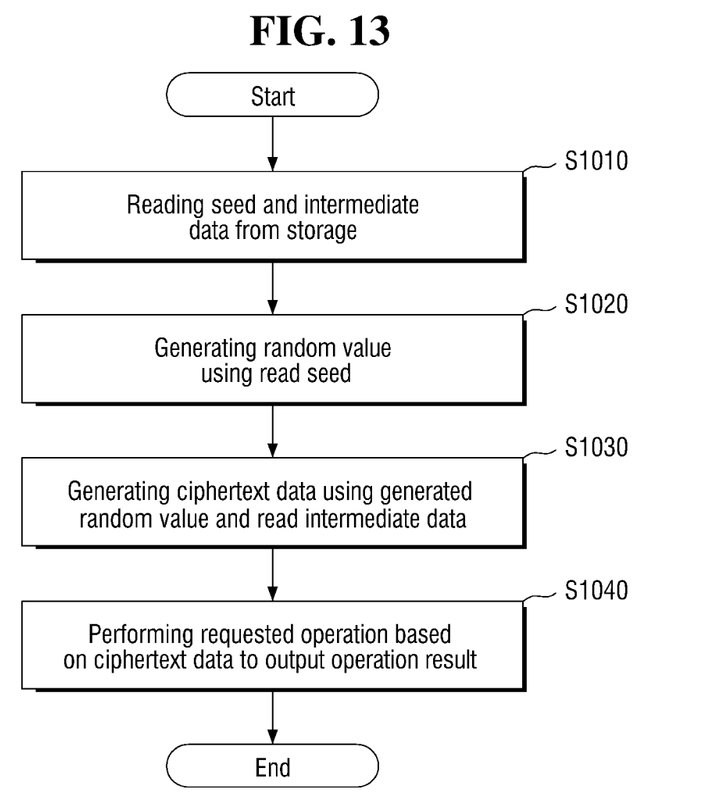
FIG. 13 is a flowchart illustrating an operating method of a cloud computing device according to exemplary embodiments of the present disclosure.

Referring to FIG. 12, in an exemplary embodiment, the edge computer 1100 does not provide the cloud computing device 1200 with user data Dm or RLWE-based ciphertext data C2n. Rather, the edge computer 1100 provides the cloud computing device 1200 with a seed Sα and encrypted intermediate data CIn.

Similar to the description above with reference to FIGS. 1 to 10, the edge computer 1100 generates the seed Sα with at least one of, for example, an address, a timestamp, or metadata corresponding to user data Dm or plaintext data Xn. The edge computer 1100 generates a random value An based on the seed Sα by means of the random number generator (e.g., a pseudo-random number generator). The edge computer 1100 generates the plaintext data Xn by encoding the user data Dm, and encrypts the plaintext data Xn using the random number An to generate the encrypted intermediate data CIn.

The edge computer 1100 provides the cloud computing device 1200 with the intermediate data CIn and the seed Sα.

If the edge computer 1100 provides the cloud computing device 1200 with the RLWE-based ciphertext data C2n, this may increase the data-sharing traffic because the RLWE-based ciphertext data C2n has the data length 2n. On the other hand, in exemplary embodiments of the present disclosure, the edge computer 1100 provides the cloud computing device 1200 with the intermediate data CIn and the seed Sα, which may reduce the data-sharing traffic because the sum of the data lengths of the intermediate data CIn and the seed Sα is n+a (α is a natural number less than n).

As shown in FIG. 12, the cloud computing device 1200 may include a storage area 1210 and a controller 1220. The storage area 1210 stores the intermediate data CIn and the seed Sα provided by the edge computer 1100.

Hereinafter, an operating method of the cloud computing device 1200 upon receipt of a request for operation on the data stored in the cloud computing device 1200 from the edge computer 1100 will be described with reference to FIGS. 12 and 13.

First, the controller 1220 reads the seed Sα and the intermediate data CIn from the storage area 1210 at operation S1010.

The controller 1220 generates a random value An using the read seed Sα at operation S1020. Here, the cloud computing device 1200 identifies the random number generator (e.g., a pseudo-random number generator) in use by the edge computer 1100 through the authentication process between the edge computer 1100 and the cloud computing device 1200. Accordingly, the controller 1220 generates the random value An by means of the identified random number generator.

Because the cloud computing device 1200 uses the random number generator that is the same as the random number generator (e.g., a pseudo-random number generator) in use by the edge computer 1100, the random value An generated by the cloud computing device 1200 is the same as the random value An generated by the edge computer 1100.

Next, the controller 1220 generates, at operation S1030, RLWE-based ciphertext data C2n using the generated random value An and the read intermediate data CIn.

As described above, the random value An, the intermediate data CIn, and the ciphertext data C2n satisfy the following relational equation:

$$C2n = (An, CIn) = (An, Bn + Xn)$$

Next, the controller 1220 performs the requested operation based on the ciphertext data C2n to output an operation result at operation S1040.

For example, because the RLWE-based ciphertext data C2n is homomorphically encrypted, it may be operated, searched, or statistically treated even in the state of not being decrypted. Accordingly, the operation requested by the edge computer 1100 may be performed without decrypting the ciphertext data C2n. The operation result obtained without decryption may be provided to the edge computer 1100. The edge computer 1100 may perform decryption/decoding with the received operation result. This process is capable of improving security during data sharing between the edge computer 1100 and the cloud computing device 1200. In an exemplary embodiment, the length of the RLWE-based ciphertext data C2n is twice the length of the random value An or the length of the intermediate data CIn.

As is traditional in the field of the present disclosure, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. An operating method of a memory controller, comprising:
   generating a random value using a seed;
   generating encrypted intermediate data by encrypting plaintext data using the random value; and
   storing the seed and the intermediate data in a memory device, wherein ciphertext data is generated using the seed and the intermediate data based on Ring Learning with Error (RLWE);
   after storing the seed and the intermediate data in the memory device, reading the seed and the intermediate data from the memory device;
   regenerating a random value using the read seed;
   generating RLWE-based ciphertext data using the regenerated random value and the read intermediate data; and
   generating additional plaintext data by decrypting the generated ciphertext data.

2. The operating method of claim 1, wherein the seed includes at least one of an address, a timestamp, or metadata corresponding to the plaintext data.

3. The operating method of claim 1, wherein the seed includes at least one of a page address or a unique ID of a NAND flash memory.

4. The operating method of claim 1, further comprising:
   encoding user data,
   wherein the plaintext data is generated using the user data, and the seed includes at least one of an address, a timestamp, or metadata corresponding to the user data.

5. The operating method of claim 1, wherein the plaintext data, the random value, and the intermediate data are equal in length.

6. The operating method of claim 1, further comprising:
   before storing the seed and the intermediate data in the memory device,
   generating parity data using at least one of the seed or the intermediate data; and
   storing the parity data in the memory device.

7. The operating method of claim 1, wherein the random value is generated using pseudo random number generation.

8. An operating method of a memory controller, comprising:
   generating a random value using a seed, wherein the seed is an address corresponding to user data or plaintext data obtained by encoding the user data;
   generating encrypted intermediate data by encrypting the plaintext data using the random value; and
   storing the intermediate data in an area corresponding to the address in a memory device, wherein ciphertext data is generated using the seed and the intermediate data based on Ring Learning with Error (RLWE), and the seed is not stored in the memory device;
   after storing the intermediate data in the memory device, receiving a command instruction to read the intermediate data stored in the area corresponding to the address;
   reading the intermediate data stored in the area corresponding to the address from the memory device;
   regenerating a random value using the address as an additional seed; and
   generating additional plaintext data by performing a decryption operation using the regenerated random value and the read intermediate data.

9. The operating method of claim 8, wherein the plaintext data, the random value, and the intermediate data are equal in length.

10. The operating method of claim 8, wherein the random value is generated using pseudo random number generation.

* * * * *